United States Patent [19]
Follmer

[11] Patent Number: 5,370,732
[45] Date of Patent: Dec. 6, 1994

[54] CLEAR-SPRAYING, CLEAR-HEATING PAN SPRAY

[75] Inventor: Christopher H. Follmer, Newbury Park, Calif.

[73] Assignee: GDK Partners, Newbury Park, Calif.

[21] Appl. No.: 74,929

[22] Filed: Jun. 10, 1993

[51] Int. Cl.$^5$ .............................................. C08L 91/00
[52] U.S. Cl. .................................... 106/244; 106/252; 106/263; 106/265; 106/267; 106/18
[58] Field of Search ............... 106/244, 252, 263, 265, 106/267, 243, 18

[56] References Cited

U.S. PATENT DOCUMENTS

| | | |
|---|---|---|
| 3,661,605 | 5/1972 | Rubin et al. ........................... 106/244 |
| 3,896,975 | 7/1975 | Follmer ................................. 106/244 |
| 4,371,451 | 2/1983 | Scotti et al. ........................... 106/244 |
| 5,296,021 | 3/1994 | Clapp et al. ........................... 106/252 |

Primary Examiner—Mark L. Bell
Assistant Examiner—Paul Marcantoni
Attorney, Agent, or Firm—Louis J. Bachand

[57] ABSTRACT

Clear-applying, non-foaming lecithin-based pan spray in which quite small amounts of water are added to form lecithin micelles against the spray foaming when applied and when heated.

33 Claims, 1 Drawing Sheet

CLEAR-SPRAYING, CLEAR-HEATING PAN SPRAY

TECHNICAL FIELD

This invention has to do with pan sprays for cooking, and more particularly with pan sprays which are delivered from aerosol cans and deposit clear on the pan. Moreover, the clarity, and absence of foaming, continues even upon heating and without the use of substantial quantities of alcohol. The invention provides the first truly clear, effective, lecithin-based, aerosol-delivered pan spray.

BACKGROUND

There is a substantial business in household and commercial pan sprays, the vast majority of which depends on lecithin-based aerosol-delivered products. A number of patents have issued over the years on improvements in these pan sprays including U.S. Pat. No. 3,896,975, U.S. Pat. No. 4,073,412, and U.S. Pat. No. 4,188,412.

Despite these efforts at optimizing pan spray formulation, there is not to my knowledge available on the market a clear-depositing, clear heating effective, lecithin-based and aerosol delivered pan spray free of maleffects such as obnoxious vapor. Consumers prefer pan sprays which most closely resemble the vegetable oils they replace. Such oils are clear when poured and when heated. They do not foam. Pan sprays, however, typically do foam, e.g. by the boiling off of their water content, or due to the surfactant effect of the lecithin content, unless they contain substantial amounts of alcohol, e.g. above 7.5% up to 15% or more alcohol by weight, e.g. U.S. Pat. No. 4,188,412. Consumers are increasingly unwilling to tolerate such a substantial alcohol content which is associated with obnoxious, astringent vapors when volatilized, as when heated in a pan. The consumer thus has the choice only of pan sprays which deposit as a foam and then go clear when heated, or those sprays which deposit as an opaque liquid and foam upon heating, i.e. emulsion or water based systems, or the substantial alcohol containing systems. Until the present invention.

SUMMARY OF THE INVENTION

This invention takes a different approach to the goal of clear-spraying, clear-heating pan sprays in which the foaming propensity of the lecithin systems are blocked by incorporating the lecithin into micelles with quite minor amounts of water insufficient to cause foaming upon heating, but sufficient to change the behavior of the lecithin to be non-foaming. The water content is so low that there is not foaming due to boil-off of the water, as in emulsion systems.

It is, accordingly, an object of this invention to provide an improved pan spray in which the product deposits clear on the pan from an aerosol dispenser, stays clear when heated, and is lecithin-based. Other objects will appear hereinafter.

It has been discovered that the objects of the invention are realized in a pan spray comprising per 100 parts by weight a pan lubricating effective sufficient amount, e.g. from about 0.3 to about 10 parts lecithin phosphatides, and a vehicle comprising the balance of the spray, e.g. 90 to 99+ parts of a sprayable mixture of vegetable oil and hydrocarbon propellant in which the lecithin tends to foam upon spraying, the vehicle including a just sufficient amount of water to form stable micelles of the lecithin and water in the vehicle against foaming of the mixture, whereby the pan spray sprays clear and remains clear on the pan during heating.

In this and like embodiments, the lecithin may be present in an amount between 1-3 and 7 parts per 100 parts by weight, the vegetable oil is typically present in an amount from about 50 to about 90 parts by weight, the propellant is present in an amount from about 10 to about 50 parts by weight, and water is present in an amount between 0.1 and 10 parts by weight.

In other embodiments of the invention pan spray, the vehicle further includes 0.001 to 1 part by weight of an antifreezing agent, the antifreezing agent is glycerine, the vehicle further includes 0.001 to 1 part of a food preservative selected from potassium sorbate, sorbic acid, methylparaben, ethylenediaminetetraacetic acid (EDTA), and mixtures thereof, the vehicle further includes an antioxidation-effective amount of an antioxidant, such as vitamin E, ascorbic acid and mixtures thereof, the vehicle may further include an ethanolic non-foaming adjuvant, such as e.g. absolute ethyl alcohol, 190° proof ethyl alcohol or ethyl alcohol containing a GRAS classified food grade denaturant, in an amount between 0.005 and 3 parts by weight, i.e. amounts below that yielding astringent vapors and sufficient to increase formulating latitude of non-foaming spray and non-foaming heating compositions, the vehicle further includes carbon dioxide and/or nitrogen in substitution for propellant from 0 to 6 weight percent of the hydrocarbon propellant, the vegetable oil comprises soybean oil, canola oil, corn oil, safflower oil, olive oil, peanut oil or mixtures thereof, and the propellant is selected from 3 and 4 carbon atom hydrocarbons and mixtures thereof, the propellant having a vapor pressure between about 31 and 70 up to 130 p.s.i.g.

In a more particularly preferred embodiment, the lecithin comprises per 100 parts by weight from 50 to 72 parts by weight phosphatides, the vegetable oil is present in an amount from about 50 to about 90 parts by weight, the propellant is present in an amount from about 10 to about 50 parts by weight, water is present in an amount between 0.1 and 10 parts by weight, the vehicle further includes up to 1 part by weight of an antifreezing agent such as glycerine, the vehicle further includes up to 1 part of a food preservative, such as potassium sorbate, sorbic acid, and methyl paraben, EDTA, and mixtures thereof, the vehicle further includes up to 3 parts by weight ethanol and further includes carbon dioxide and/or nitrogen in substitution for propellant from 0 to 6 weight percent of the hydrocarbon propellant.

In this and like embodiments, preferably, the vegetable oil comprises soybean oil, canola oil, corn oil, safflower oil, olive oil, peanut oil or mixtures thereof, or like edible oils useful in pan lubrication, the propellant is selected from 3 and 4 carbon atom hydrocarbons and mixtures thereof, the propellant having a vapor pressure between about 31 and 70 up to 130 p.s.i.g. and is present in an amount from 10 to 30 parts by weight, the vegetable oil is present in an amount from 65 to 80 parts by weight, and the lecithin comprises from 50 to 72 parts by weight phosphatides, all per 100 parts by weight of the composition.

The invention further contemplates the method of blocking foaming of lecithin based pan sprays in a propellant and vegetable oil vehicle, including forming micelles of the lecithin with water before spraying with or without incorporating in the water from 5% to 30% by weight ethanol based on the weight of the water.

THE DRAWING

The invention will be further described in conjunction with the attached drawing in which FIG. 1 is a ternary diagram depicting the invention compositions in terms of weight per cent.

DETAILED DESCRIPTION

Figure 1:
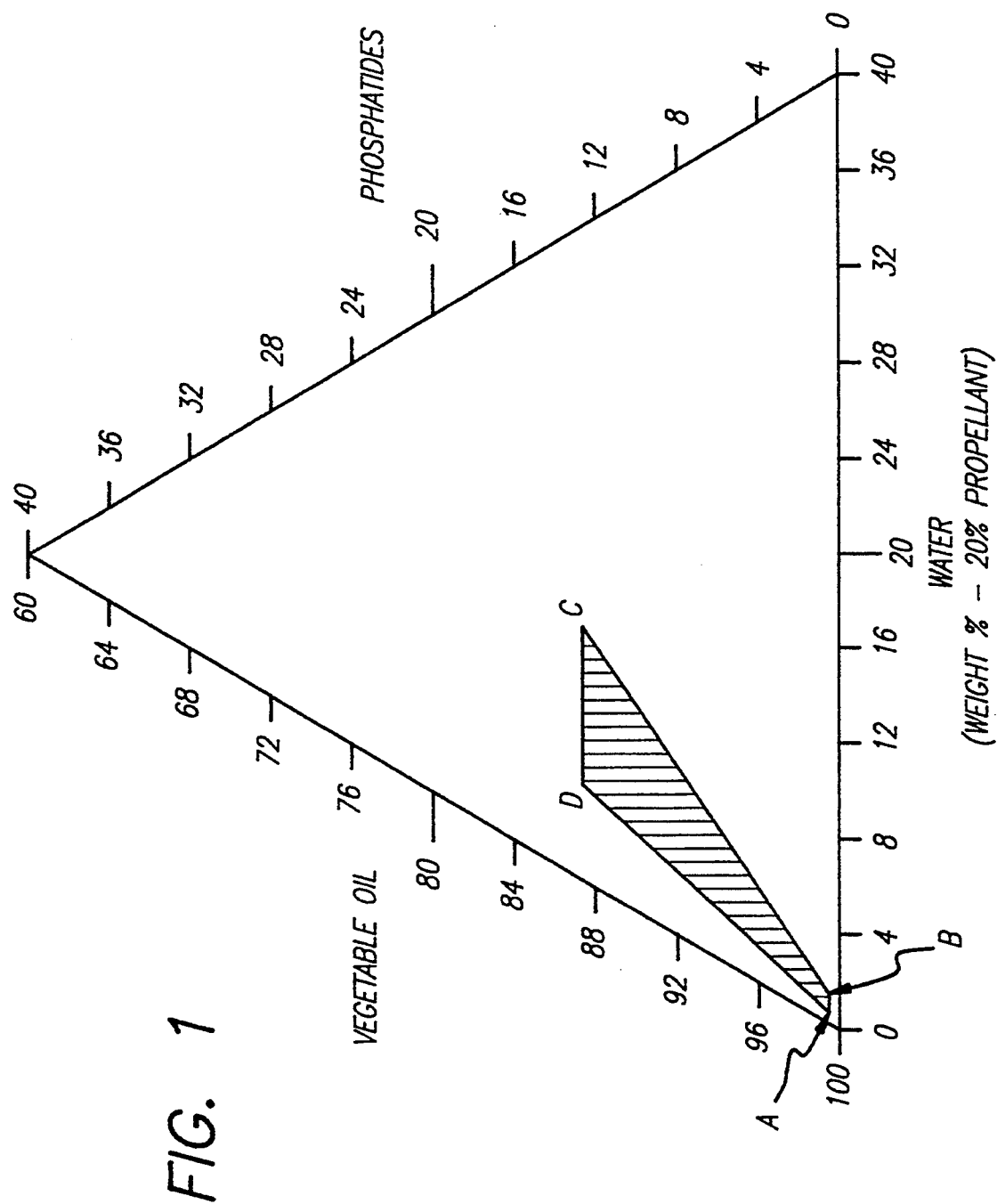

The chemistry of aerosol delivered, lecithin-based pan sprays is well known, but the goal of more closely simulating typical liquid vegetable oils has proved elusive until the present discovery that the use of quite small amounts of water enables the formation of water/lecithin micelles and the elimination of the propensity to foam otherwise characteristic of lecithin based pan sprays, including pan sprays containing both water and alcohol.

As noted above, the present invention employs lecithin, a natural product typically obtained from soybeans, and then generally comprising a major weight amount, preferably 50 to 72% phosphatides, typically comprised of phosphatidyl choline (12–46% by weight), phosphatidyl ethanolamine (8–34% by weight) and phosphatidyl inositol (7–20% by weight). Other lecithins e.g. such lecithins as those specially prepared to be heat stable or water dispersible may be used. While the proportions are not narrowly critical, the use of from 0.3 or more preferably from 1 to 10 parts, and preferably 3 to 7 parts of lecithin, per 100 parts by weight of the composition has been found highly useful in the invention formulations, with less, down to 0.5 part up to 25 parts, by weight, per 100 parts, being usable but not affording cost or performance benefits commensurate with the difference in concentration.

The present products are intended to be aerosol delivered. Thus, the invention uses a propellant, generally a hydrocarbon, nitrogen, $CO_2$, or compressed air propellant because of environmental concerns, and preferably a hydrocarbon propellant, such as a 3 and/or 4 carbon atom hydrocarbon, providing a pressure within the container between 31 and 70 up to 130 p.s.i.g., such as may be obtained with various blends of propane (109 p.s.i.g at 70° F.) and isobutane (31 p.s.i.g. at 70° F.) with or without nitrogen, carbon dioxide and/or compressed air being added to the blend. Generally from 10 to 50 parts by weight of propellant is used in the composition.

A vegetable oil is incorporated into the composition, generally in major weight amounts, i.e. the vegetable oil content is equal to or larger than any other single ingredient, and typically the content of vegetable oil in the composition ranges from 50 to about 90 parts, and preferably 65 to 80 parts by weight per 100 parts by weight of the composition. While any comestible vegetable oil may be used, preferred oils include soybean oil, peanut oil, canola oil, corn oil, safflower oil and the like, and mixtures thereof. Small but effective amounts of government approved antioxidants such as tert-butylhydroxyquinoline (TBHQ), and of anti-foaming agents such as methyl silicone may be used in particular situations for specific effects in connection with use of the foregoing vegetable oils.

The final significant component of the composition is water, added at micelle forming concentrations, e.g. from 5% to 30% by weight of the lecithin, or from 0.1 to 10 parts by weight per 100 parts by weight of the total composition, with more being possible to use but not generally required to achieve the micelle condition of the lecithin, and likely to cause cloudiness or foaming if used in excess. The desired quite minor amount of water is not such as will form a oil-in-water emulsion in the manner of U.S. Pat. No. 3,896,975. It has been reported in U.S. Pat. No. 4,188,412 that water content in excess of about 2% will cause cloudiness and foaming upon delivery in a lecithin/propellant system containing large amounts of alcohol. Present experimental results demonstrate that upon mixing the minor amounts of water with the lecithin under micelle forming conditions, including moderate agitation, cloudiness and foaming are avoided. See the following Examples.

While not wishing to be bound to any particular theory, it is believed that an absence of foaming in use of the present pan sprays is attributable, at least in part, to an increase in the insolubility of the lecithin phosphatides in the vegetable oil. The increase in insolubility may be achieved by selective hydration of the phosphatides resulting in the formation of stable micelles wherein minute water droplets are surrounded by phosphatides, a water-in-oil emulsion. A two phase system is formed between the oil/hydrocarbon phase and micelles. Formation of a foam is not favored since foam formation requires a low flexible surface tension in the presence of a surfactant, whereas the present water/lecithin micelles are an inelastic, not flexible, high surface tension component, not conducive to foam formation. The micelles, less than 1 $\mu$m in size, are too small to be noticed by the unaided eye, and water and any residual hydrocarbons are carried off without appearing as foam. It has further been determined that the presence of propellant is not inimical to the intended micelle formation and the achievement of non-foaming compositions. The use of ethanol, in small amounts, less than about 3 parts per 100 parts of the composition, does not interfere with micelle formation either, and ensures non-foaming results when formulating with certain combinations of components of the present composition. In certain formulations, the use of the suggested quite small amounts of ethanol will improve the dispersion characteristics of the spray through a decrease in the viscosity of the oil/water/gas mixture, and through a solubilization of some fractions of the lecithin, e.g. phosphatidyl choline and phosphatidyl ethanolamine, such that the phosphatides are more evenly spray-dispersed. The presence of the ethanol will also decrease the viscosity of the composition, enabling the use of less propellant, and contribute antioxidant and antimicrobial activity, as ethanol exhibits these properties.

The invention compositions with or without ethanol may also include for their usual purposes in their usual amounts, such as noted above, an antifreezing agent, such as glycerine, a food preservative, such as sorbic acid, potassium sorbate, or methylparaben, EDTA, and mixtures thereof, and an antioxidant, such as Vitamin E, ascorbic acid and mixtures thereof.

EXAMPLES

The invention will be illustrated by the following Examples, in which all parts and percentages are by weight.

Examples 1–4

A series of four compositions were prepared according to the following general preparation. Into a suitable vessel were measured the below-indicated amounts of vegetable oil, lecithin and water and the mixture homogenized in a blender. The mixture was placed in a pressure resistant bottle, which was capped and pressurized with the indicated amount of propellant.

EXAMPLE 1

A pan spray was prepared using per 100 parts by weight 0.16 part of water, 0.50 part of lecithin phosphatide, 79.34 parts of vegetable oil, and 20 parts propellant.

EXAMPLE 2

A pan spray was prepared using per 100 parts by weight 0.42 part of water, 0.63 part of lecithin phosphatide, 79.09 parts of vegetable oil, and 20 parts propellant.

EXAMPLE 3

A pan spray was prepared using per 100 parts by weight 8.3 parts of water, 10 parts of lecithin phosphatide, 61.7 parts of vegetable oil, and 20 parts propellant, a propane/isobutane blend having a pressure between 31 and 70 p.s.i.g.

EXAMPLE 4

A pan spray was prepared using per 100 parts by weight 3.36 parts of water, 10 parts of lecithin phosphatide, 66.74 parts of vegetable oil, and 20 parts propellant.

The example formulations were packed in clear polyurethane-coated glass aerosol containers (4 or 6 oz.) so that micelle formation and stability could be monitored. The formulations were inspected for the presence of micelles which were identified as a loose flocculent settling to the lower half of the container (sedimentation). If micelles were observed, the formula was considered a 2-phase system (micelles and vegetable oil-hydrocarbon).

After pressurization, the formulations were evaluated after mild to moderate shaking to disperse any micelles throughout the vegetable oil. The formulations were evaluated for the ease of micelle dispersion before spraying and the presence of foaming and cloudiness upon spraying. The contents were sprayed on an unheated stainless steel frying pan.

Typically, in the absence of water, pan spray products comprising lecithin, vegetable oil and propellant in proportions suggested in the present disclosure appear as a clear single phase liquid which foams upon spraying. Adding water in quite small amounts induces micelle formation and suppresses a foamy appearance on spraying. Further additions of water beyond that forming sufficient micelles to inhibit foaming, increases micelle sedimentation volume observed within the container which is manifested as a cloudy appearance in the product upon spraying.

Addition of food preservatives, anti-oxidants, non-ionic surfactants, and an anti-freeze agent tends to increase the micelle sedimentation volume inside the container and facilitate micelle dispersion.

Ethanol, when present, tends to decrease the sedimentation volume slightly, but has no obvious effect on the clarity of spray up to the preferred level of ethanol of about 30% of the water content. Greater amounts of ethanol content may cause the product to become foamy, and after several days of standing, a dense precipitate forms which is not readily dispersed into the oil phase even with vigorous shaking.

The compositions of Examples 1–4 are graphed in the accompanying FIG. 1 wherein the relationship among vegetable oil, water and lecithin (expressed as phosphatides, i.e. the acetone insoluble fraction of lecithin) in the presence of 20% by weight propellant is depicted. The area ABCD represents preferred invention compositions all of which are clear-spraying, clear-heating, and effective as pan lubricants. Areas outside the ABCD area may be deficient in clarity of spray, clarity on heating or in pan lubricating effectiveness in some cases. Variations in specific ingredients, particularly in ingredients derived from natural materials, mode of mixing, length of time between formulation and testing will affect the performance of the described products and thus the numerical limits placed on the invention compositions herein are subject to small variations e.g. +/−20% to account for these factors.

EXAMPLE 5

A pan spray is prepared as in Examples 1–4 using per 100 parts by weight 3 parts water, 8 parts of lecithin phosphatides, 0.3 parts ethanol, 65 parts vegetable oil, and the balance propellant. The pan spray is easily dispersed, and does not foam upon application or heating.

EXAMPLE 6

A pan spray was prepared using per 100 parts by weight 2 parts water containing 0.17% by weight potassium sorbate, 0.08% by weight sorbic acid and 0.01% ethylene diamine tetraacetic acid (EDTA), 7.8 parts lecithin, 70.2 parts propane/isobutane propellant blend having a pressure between 31 and 70 p.s.i.g. The spray was clear in deposit and clear upon heating and effective as a pan lubricant.

The foregoing objects of an improved pan spray in which the product deposits clear on the pan from an aerosol dispenser, stays clear when heated, and is lecithin-based are thus met.

I claim:

1. Clear, two-phase, nonfoaming pan spray comprising per 100 parts by weight a liquid first phase comprising from 90 to 99 parts of a sprayable mixture of propellant and vegetable oil, and a flocculent second phase comprising from 0.3 to 10 parts lecithin and a just sufficient amount of water to hydrate said lecithin and make it more insoluble in said first phase mixture of vegetable oil and propellant such that said lecithin will not form a foam with said first phase mixture upon application of the pan spray onto a pan, said amount of water being less than will cause cloudiness in said pan spray, whereby said pan spray sprays clear and remains clear on the pan during heating.

2. Pan spray according to claim 1, in which said said second phase flocculent comprises micelles of said water surrounded by said lecithin, said micelles being of less than 1 μm in size.

3. Pan spray according to claim 1, in which said vegetable oil is present in an amount from about 50 to about 90 parts by weight.

4. Pan spray according to claim 1, in which said propellant is present in an amount from about 10 to about 50 parts by weight.

5. Pan spray according to claim 1, in which water is present in an amount between 0.1 and 10 parts by weight.

6. Pan spray according to claim 1, in which said vehicle further includes 0.001 to 1 part by weight of an antifreezing agent.

7. Pan spray according to claim 6, in which said antifreezing agent is glycerine.

8. Pan spray according to claim 1, in which said pan spray further includes 0.001 to 1 part by weight of a food preservative.

9. Pan spray according to claim 8, in which said preservative is selected from potassium sorbate, sorbic acid, methylparaben, EDTA, and mixtures thereof.

10. Pan spray according to claim 1, in which said pan spray further includes an amount of an antioxidant effective to prevent oxidation.

11. Pan spray according to claim 10, in which said antioxidant is selected from vitamin E, ascorbic acid and mixtures thereof.

12. Pan spray according to claim 1, in which said pan spray further includes ethanol in an amount between 0.005 and 3 parts by weight.

13. Pan spray according to claim 1, in which said propellant comprises one or more gases selected from hydrocarbons, carbon dioxide, nitrogen and compressed air.

14. Pan spray according to claim 1, in which said vegetable oil comprises soybean oil, canola oil, corn oil, safflower oil, olive oil, peanut oil or mixtures thereof.

15. Pan spray according to claim 1, in which said propellant is selected from 3 and 4 carbon atom hydrocarbons and mixtures thereof, said propellant having a vapor pressure between about 31 and 70 p.s.i.g.

16. Pan spray according to claim 1, in which said lecithin comprises from 50 to 72 parts by weight phosphatides.

17. Pan spray according to claim 16, in which said vegetable oil is present in an amount from about 50 to about 90 parts by weight.

18. Pan spray according to claim 17, in which said propellant is present in an amount from about 10 to about 50 parts by weight.

19. Pan spray according to claim 18, in which water is present in an amount between 0.1 and 10 parts by weight.

20. Pan spray according to claim 19, in which said vehicle further includes up to 1 part by weight of an antifreezing agent.

21. Pan spray according to claim 20, in which said antifreezing agent is glycerine.

22. Pan spray according to claim 21, in which said pan spray further includes up to 1 part by weight of a antibacterial agent as a food preservative.

23. Pan spray according to claim 22 in which said antibacterial agent is selected from potassium sorbate, sorbic acid, methylparaben, EDTA, and mixtures thereof.

24. Pan spray according to claim 23, in which said pan spray further includes up to 3 parts by weight ethanol.

25. Pan spray according to claim 1, in which said propellant provides a pressure of about 31 to 70 p.s.i.g. at 70° F.

26. Pan spray according to claim 25, in which said vegetable oil comprises soybean oil, canola oil, corn oil, safflower oil, olive oil, peanut oil or mixtures thereof.

27. Pan spray according to claim 25, in which said propellant comprises a blend of propane and isobutane, from 0 to 4% nitrogen, and from 0 to 6% carbon dioxide and has a vapor pressure between about 31 and 130 p.s.i.g. at 70° F.

28. Pan spray according to claim 27, in which said propellant is present in an amount from 10 to 30 parts by weight.

29. Pan spray according to claim 28 in which said vegetable oil is present in an amount from 65 to 80 parts by weight.

30. Pan spray according to claim 29, in which said lecithin comprises from 50 to 72 parts by weight phosphatides.

31. Pan spray having the composition denoted by the area ABCD in the FIGURE.

32. Method of blocking foaming of lecithin based pan sprays in a propellant and vegetable oil, including forming said lecithin into a separate phase in said propellant and vegetable oil comprising flocculent micelles of said lecithin with water before spraying said pan spray.

33. Method according to claim 32, including also incorporating in said water from 5% to 30% by weight ethanol based on the weight of said water.

* * * * *